United States Patent [19]
Liu

[11] Patent Number: 5,103,390
[45] Date of Patent: Apr. 7, 1992

[54] AC LOAD SIMULATOR

[75] Inventor: Daniel Liu, Taipei, Taiwan

[73] Assignee: Prodigit Electronics Co. Ltd., Taipei, Taiwan

[21] Appl. No.: 580,186

[22] Filed: Sep. 10, 1990

[51] Int. Cl.[5] .......................................... H02M 5/293
[52] U.S. Cl. .................................... 363/132; 363/98; 324/123 C; 328/27
[58] Field of Search ...................... 363/16, 17, 97, 98, 363/131, 132; 324/123 R, 123 C; 328/21, 27

[56] References Cited

U.S. PATENT DOCUMENTS

| | | | |
|---|---|---|---|
| 3,976,932 | 8/1976 | Collins | 363/132 |
| 4,020,361 | 4/1977 | Suelzle | 363/132 |
| 4,849,651 | 7/1989 | Estes, Jr. | 363/132 |
| 4,941,076 | 7/1990 | Diaz | 363/98 |

Primary Examiner—Peter S. Wong
Attorney, Agent, or Firm—Asian Pacific International Patent and Trademark Office

[57] ABSTRACT

An AC load simulator for simulating the waveforms of capacitive reactance, inductive reactance, impedance or any waveform in an A.C. circuit for a better understanding and inspecting of the working status of an A.C. supply or a power part in a specific load. The simulator mainly comprises a waveform generator, an analogy signal insulating amplifier, an electronic A.C. load and a compensation circuit, wherein the waveform generator produces sinusoidal wave or any other signal in waveform. The above parts together with the circuit, an A.C. load simulator for generating any kind of waveform is integrated.

6 Claims, 5 Drawing Sheets

AC LOAD SIMULATOR

BACKGROUND OF THE INVENTION

In a research or an experiment, electrical characteristics, reliability, stability and safety of the A.C. supplying device and the power parts in the state of reactance load or specific load are usually unable to be inspected and examined. Therefore much time, labor and resources are wasted. Although the passive components such as inducer and capacitor can be used to simulate loading characteristics, or direct connection with an actual load can also be used, the set up procedure is generally clumsy, not easy to handle, difficult to arrange, and difficult to increase or decrease the power level. Therefore, a practical active AC load simulator is required to overcome the above drawbacks. The present invention provides an active AC load simulator to simulate the waveforms of capacitive reactance, inductive reactance, impedance and any selective form of wave in an AC circuit for inspecting and examining if the AC supply, power part in the state of reactance load or specific load function normally. The AC supplying device mentioned above can be an AC supplier, frequency changer and non-stop current system stabilizer, etc. The present invention can also be applied to the test for power factor, AC meter, etc. Examples of the power part above are power semiconductor such as rectifier, SCR, TRIAC, any kind of transistor; relay such as capacity solid state relay; breaker, fuse; transformer, capacitor,

SUMMARY OF THE INVENTION

The present invention relates to an A.C. load simulator for simulating the waveforms of capactive reactance, inductive reactance, impedance and a selective waveform, in an A.C. circuit for a better understanding and inspecting of the working status of an A.C. supply or a power part in a specific load. The simulator mainly comprises a waveform generator, an analog signal insulating amplifier, an electronic A.C. load and a compensation circuit, wherein the waveform generator produces a sinusoidal wave or any other waveform signal. The above parts together with the circuit are integrated into an A.C. load simulator for generating any form of wave.

DETAILED DESCRIPTION OF THE EMBODIMENTS OF THE PRESENT INVENTION

Figure 1:
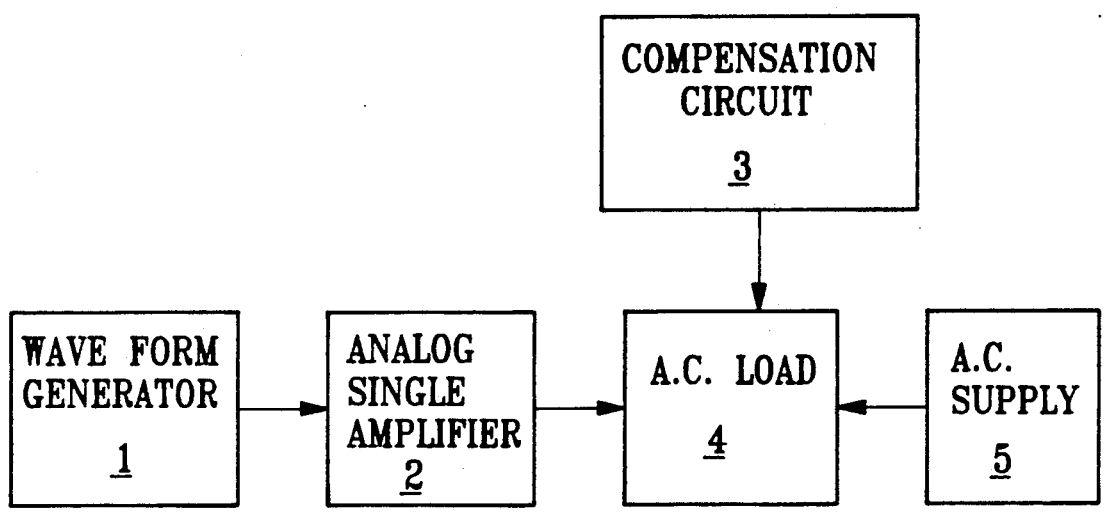
FIG. 1 is a block diagram of the present invention.
Figure 2:
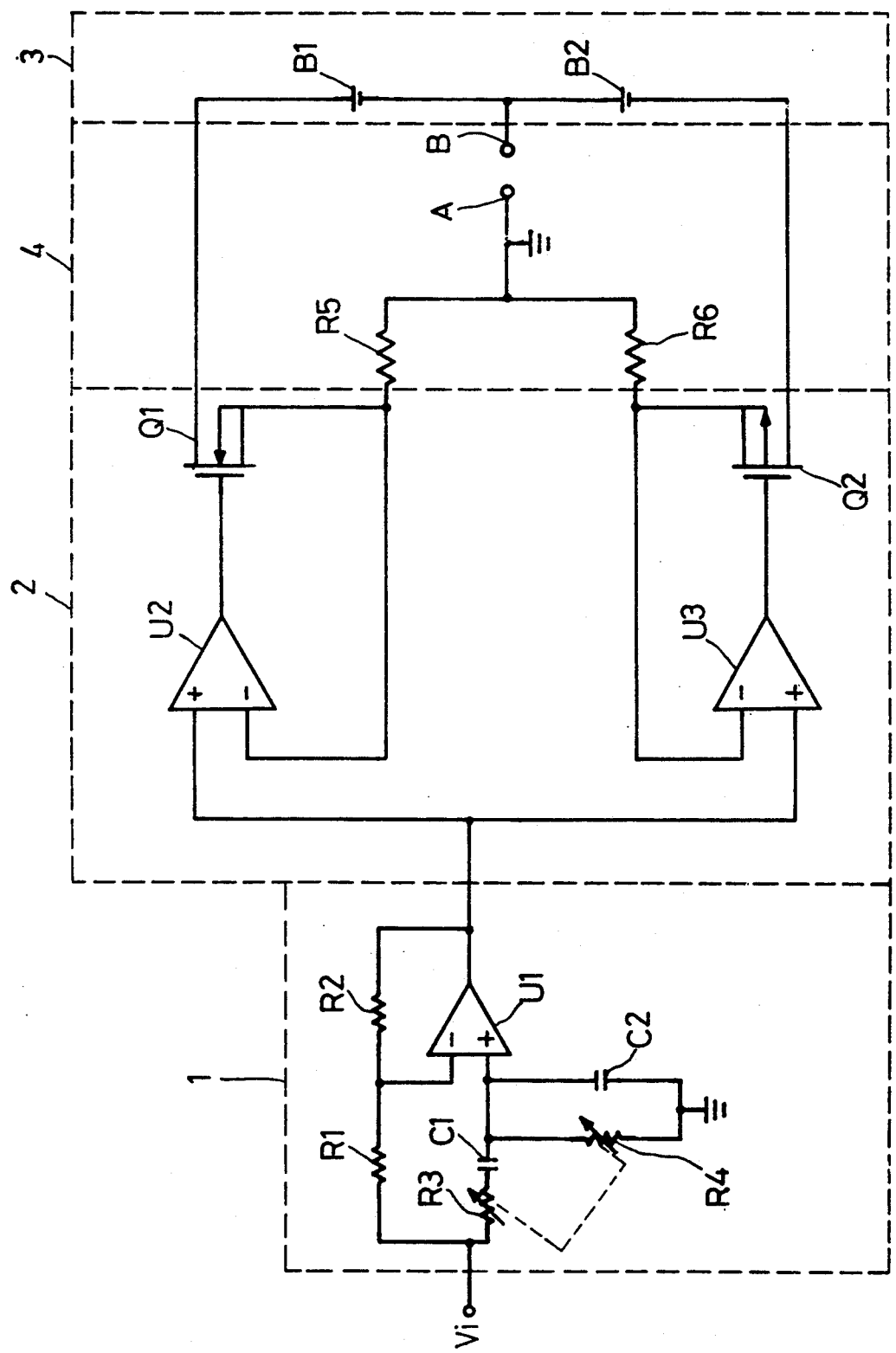
FIG. 2 is the controlling circuit of the first embodiment of the present invention.

Referring to FIG. 1, the present invention mainly comprise a wave form generator 1, an analog signal insulating amplifier 2, a compensation circuit 3, an electronic A.C. load 4, and an A.C. supply 5. The first embodiment of the system is illustrated in FIG. 2, in which the wave form generator 1 includes a phase-shifting circuit having an input terminal through which an input signal Vi is supplied by an A.C. source via a reactance attenuator. The phase-shifting circuit comprises an operational amplifier U1, resistors R1, R2, R3, R4, capacitors C1 and C2, through which a phase lead or a phase lag is obtained. The circuit is characterized by the features of a complete pass filter whose amplitude is independent of frequency. The filter has a phase-shifting function by which the input signal Vi can be shifted from $-180°$ to $+180°$ with the voltage remaining unaffected. The resistors R3 and R4 are adjustable and connected such that the output voltage can be shifted by adjusting their resistances. When the resistance is adjusted to zero the phase shifts $+180°$, and when the resistance is turned to infinity the phase shifts $-180°$. If the output voltage loads the input voltage Vi, capacitive reactance is simulated. If the output voltage leads the input, inductive reactance is simulated. If both the output voltage and the input voltage are in phase, impedance is simulated. The output signal supplied by the wave form generator 1 acts as the input of the analog signal insulating amplifier 2 and also as a controlling load signal in the electronic A.C. load 4.

The analog signal insulating amplifier 2 is made up of two parts. One part including an operational amplifier U2, associated with a power MOSFET Q1 to form a positive half-cycle controlling circuit. The other includes an operational amplifier U3, associated with a power MOSFET Q2 to form a negative half-cycle controlling circuit. In the status of the positive half-cycle, the voltage output of the wave form generator 1 is converted into a current signal by the resistor R5 via the operational amplifier U2 and the power MOSFET Q1. Similar situation applies in the negative half-cycle. When an AC supply or a power part is connected across the terminals A and B of the electronic AC load, an AC signal is transmitted through the resistor R6 and the electronic AC load 4 functions as an AC supply simulating load loop.

When the electronic AC load 4 is in the state of resistance load, compensation circuit 3 is not required because the voltage and the current are in phase. However, in the condition of inductive reactance or capacitive reactance load, compensation circuit 3 is required to make the compensating voltages B1 and B2 for the positive half-cycle loop and the negative half-cycle loop respectively to resolve the problem of phase difference between the voltage and the current. For instance, in the state of constant inductive reactance, the current lags the voltage. The current may be probably in the way of the positive half-cycle while the voltage is still in the way of the negative half-cycle. Therefore, a compensation circuit is necessary to make the voltage and the current in phase whenever they are in the positive half-cycle or in the negative one.

Figure 3:
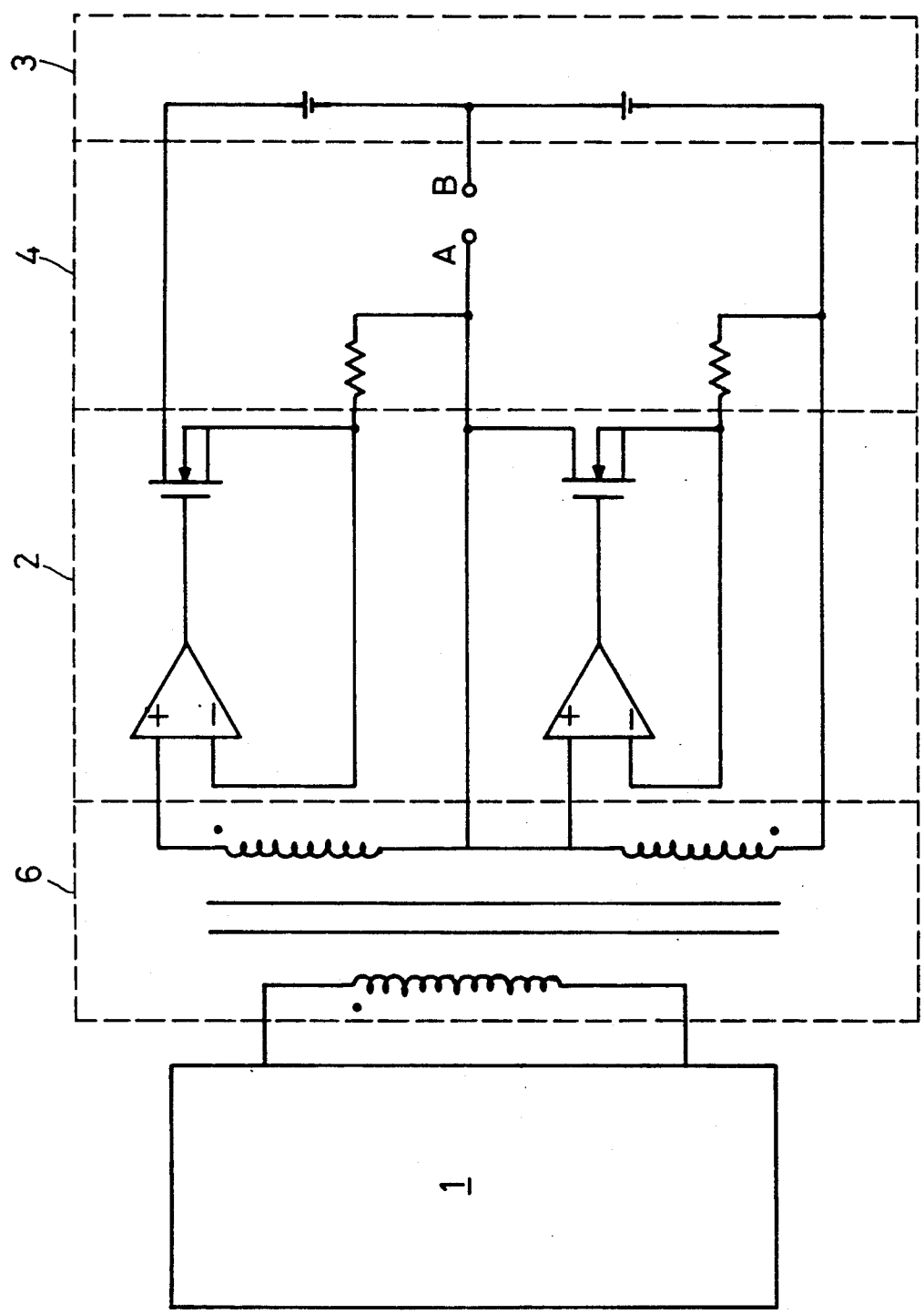
FIG. 3 is the controlling circuit of the second embodiment of the present invention.

FIG. 3 illustrates another embodiment of the present invention. The voltage output from the wave form generator 1 is separately sent ot the analog signal insulating amplifier 2 as the positive half-cycle voltage and the negative half-cycle voltage respectively via the isolating transformer 6. This fact allows the positive negative half-cycle loop to function in a separated condition. In practice, the power MOSFET of N type channel is used in the power MOSFET of the analog signal insulating amplifier 2 due to the high voltage situation.

Figure 4:
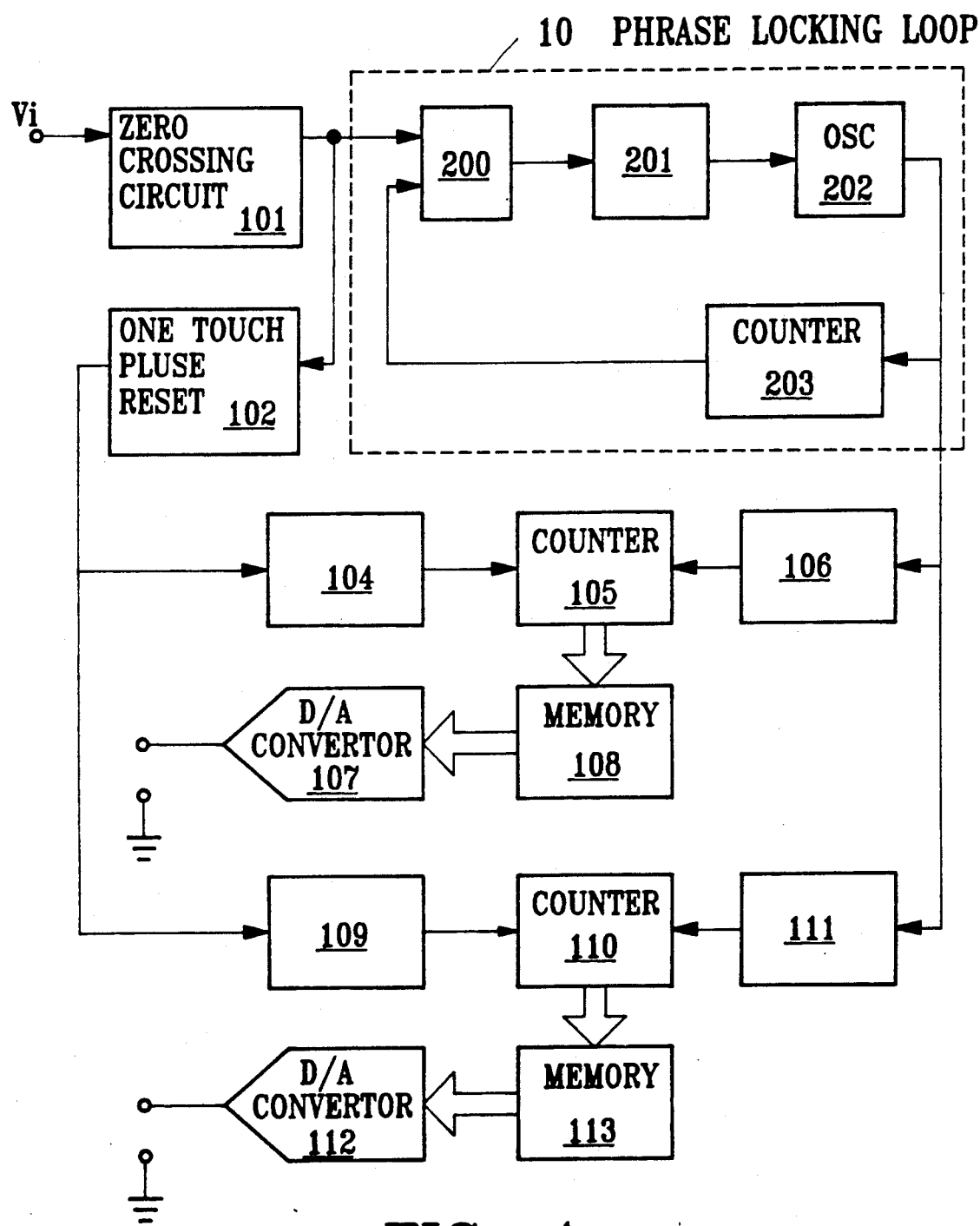
FIG. 4 is a wave form generator in the controlling circuit of an embodiment of the present invention.

The waveform generator of the embodiment in FIG. 2 has a phase-shifting function. This embodiment is suitable for the sinusoidal condition. If simulating the other waveforms, a generator for generating a selective waveform is required. As shown in FIG. 4, the generator comprises:

a zero-crossing circuit 101 for inspection of the zero-crossing point of the voltage signal input;

an one-touch circuit 102 to convert the signal generated from the zero-crossing circuit to a single-stroke pulse wave output;

a phase-locking loop 103 which includes a voltage controlling oscillator 202 and a counter 203, transmitting an output signal with the frequency K times the frequency of the input signal;

a positive half-cycle countering loop including a counter 105 which receives the signal from the one-touch circuit 102 via the photo-coupling isolator. This signal is the reset signal. Together with the counter pulse wave from another phot-coupling isolator 106, the resulting counter is input into the memory 108. Finally, the waveform recorder and stored in the memory 108 is read out through the digital-to-analog converter 107;

a negative half-cycle countering loop including a counter 110 which receives the reset signal from the photo-coupling isolator 109. Together with the counter pulse wave from another phot-coupling isolator 111, the resulting counter is input into the memory 113. Finally, the waveform recorded and stored in the memory 113 is read out through the digital-to-analog converter 112. The experimental data of the present invention is illustrated below as a reference:

1. This invention can be applied to various kinds of impedance load simulation, such as pure resistance, pure inductance, pure capacitance, impedance and capacitance, etc. due to a phase-shifting characteristic of the circuitry ($+90° \sim -90°$ in voltage as reference). For instance, in a stable sinusoidal state, a) when the current and the voltage are in phase:

$$I = \frac{V}{Z} \quad Z = R = \frac{V \sin wt}{I \sin wt} = \frac{V \angle 0°}{I \angle 0°}$$

the value of current is determined by R and it is the simulation of a basic AC load.

b) when the current leads the voltage (capacitive load)

$$Z = R = jxc = \frac{V \angle 0°}{I \angle 0°} = \frac{V}{I} \angle -\psi$$
$$R = \frac{V}{I} \cos \psi \quad jxc = \frac{V}{I} \sin \psi$$

when $\psi$ is $\pi/2$, R=0 (pure inductive load).

In a particular load of 1 KVA, when the input voltage is 100 VAC, the maximum current is 10 A, ie. $Z = 100/10 = 10 \Omega$ (maximum)
then $Z = R + jx = 10 (\cos \theta + j\sin \theta)$
$-90° \leq \theta \leq 90°$
when $xc = \frac{V}{I} \sin \theta$
$xc = 10 \Omega \sim \infty$ ($\theta \leq 0$) simulating range
$xl = 10 \Omega \sim \infty$ ($\theta \geq 0$)

Figure 5:
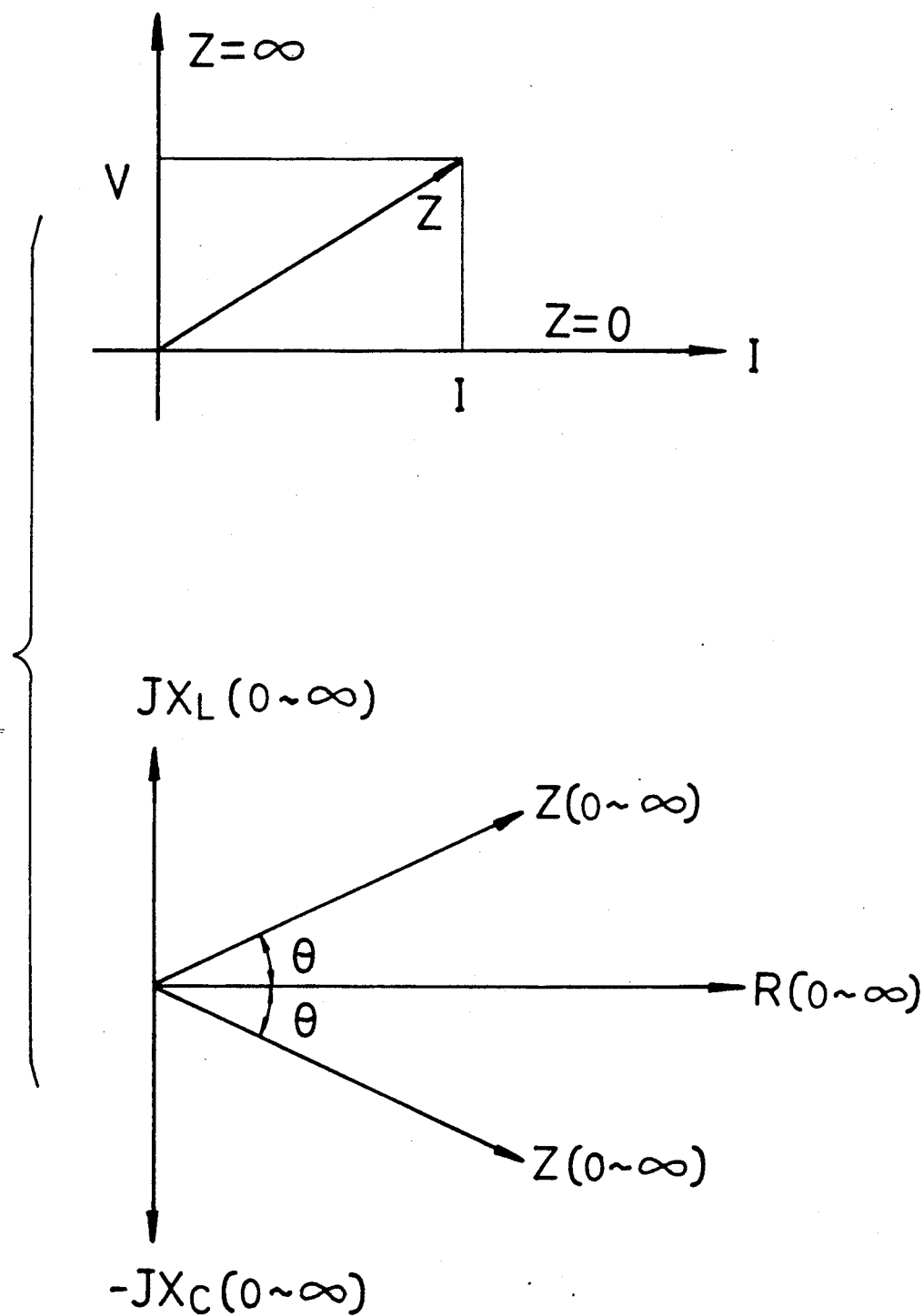
FIG. 5 is a load simulation diagram of the present invention.

Simulation can also be achieved by changing the values of V and I. The load simulation is shown in FIG. 5

Based on the above operation, the absolute value of the resultant Z of the selective capacitance and inductance (in a stable sinusoidal state) can be simulated only by changing the values of V/I and the phase difference between the current and the voltage. $|Z|$ can be determined by I, whereas R, XL and XC determined by the phase difference between the current and the voltage. When $|Z|$ varies from $0 \sim \infty$, and phase difference ranges from $-\pi/2 \sim \pi/2$, the simulation of the impedance of R-L-C circuit in the stable sinusoidal state is achieved. 2. The present invention is capable of examining a wide range of signal waveforms. The selective AC waveform is referred to the actual waveform in practice. Sinusoidal wave, square wave, inclined wave or triangular wave are the standard wave signals which are used to examine the object submitted. The current output depends on the load of the AC supplying device or the non-stop power supply system. If sinusoidal wave, triangular wave or square wave is exploited, the selective waveform generator is required for the simulation of the waveform. The device is characterized by the fact that the waveform is programmable. i.e. each cycle of the wave is divided into m equal parts whose values are separately input into the memory. The values are then transmitted to a time sequence control circuit memory and a digital-to-analog converter (D/A converter). Various waveforms can be obtained by changing the data in the memory. Therefore, it is called selective waveform. In practice, we can see the actual current waveform in an oscilloscope and divide the cycle into m equal parts. Each part has its individual voltage (data), and the data which resresents the voltage is input into the memory and the selective output wave is obtained. Consequently, the actual current is simulated and can be submitted to the examination. 3. The present invention is used to examine the AC supplying device such as the AC supplier, non-stop current supplying system or AC generator. The current frequencies are therefore 50 Hz, 60 Hz or 400 Hz in the commercially, industrially or militarily used current respectively. In addition, the voltage is generally classified as a standard of 100 V, 115 V, OR 230 V, and the power capacities are 50 VA, 1000 VA and 2000 VA respectively. Therefore the ranges of capacitive reactance, reactance and impedance are determined by the inter-relationship of frequency, voltage and power capacity.

What is claimed is:

1. An A.C. load simulator comprising a waveform generator having an A.C. voltage input and an A.C. waveform output, said output including a positive waveform component and a negative waveform component;

an analog signal insulating amplifier amplifier having an input connected to the generator output, said amplifier having an output that comprises two A.C. load terminals (A and B) adapted for connection to an external A.C. circuit for examination thereof;

said amplifier having a positive half cycle controlling circuit connected between said generator output and said load terminals, said amplifier having a negative half cycle controlling circuit connected between said generator output and said load terminals;

said positive half cycle controlling circuit and said negative half cycle controlling circuit being in parallel with each other between said generator output and said load terminals.

2. The A.C. load simulator of claim 1, wherein each half cycle controlling circuit comprises an operational amplifier (U2 or U3) and a power MOSFET.

3. The A.C. load simulator of claim 2, wherein each said operational amplifier has one input terminal thereof connected to the generator ouput and one input terminal thereof connected to one of said load terminals; each said MOSFET having an input connected to the associated operational amplifier and an output connected to the other load terminal.

4. The A.C. load simulator of claim 3, wherein said one load terminal is at ground potential.

5. The A.C. load simulator of claim 1, wherein said waveform generator comprises an A.C. voltage source, a zero-crossing circuit connected to said voltage source, a one-touch circuit (102) connected to said zero-crossing circuit for generating a single stroke pulse reset signal, a phase-locking loop (103) connected to said zero-crossing circuit in parallel with said one-touch circuit, a positive half-cycle countering loop having separate connections to said one-touch circuit and to said phase-locking loop, and a negative half-cycle countering loop having separate connections to said one-touch circuit and to said phase-locking loop, said positive half-cycle countering loop and said negative half-cycle countering loop being in parallel with each other.

6. The A.C. load simulator of claim 5, wherein said waveform generator further comprises a separate memory (108 or 110) connected to each countering loop for digitally storing the loop output signals.

* * * * *